US009961131B2

(12) United States Patent
Lowekamp et al.

(10) Patent No.: US 9,961,131 B2
(45) Date of Patent: May 1, 2018

(54) ENHANCED RELIABILITY FOR CLIENT-BASED WEB SERVICES

(71) Applicant: Microsoft Corporation, Redmond, WA (US)

(72) Inventors: Bruce Bernard Lowekamp, Williamsburg, VA (US); Matthew Todd Kaufman, Bonny Doon, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 777 days.

(21) Appl. No.: 14/262,681

(22) Filed: Apr. 25, 2014

(65) Prior Publication Data

US 2015/0312325 A1    Oct. 29, 2015

(51) Int. Cl.
*H04L 29/08* (2006.01)
*H04L 29/06* (2006.01)

(52) U.S. Cl.
CPC .............. *H04L 67/10* (2013.01); *H04L 67/02* (2013.01); *H04L 67/28* (2013.01); *H04L 67/2833* (2013.01); *H04L 67/2861* (2013.01); *H04L 67/42* (2013.01)

(58) Field of Classification Search
CPC .......... H04L 67/10; H04L 67/42; H04L 67/28
See application file for complete search history.

(56) References Cited

U.S. PATENT DOCUMENTS

| 7,518,983 | B2 | 4/2009 | Yokota et al. |
| 7,797,406 | B2 | 9/2010 | Patel et al. |
| 7,984,157 | B2 | 7/2011 | Panasyuk et al. |
| 2006/0085429 | A1 | 4/2006 | Wener et al. |
| 2010/0150320 | A1* | 6/2010 | Lingafelt ............ H04L 12/1831 379/68 |
| 2011/0299454 | A1* | 12/2011 | Krishnaswamy . H04W 52/0229 370/328 |
| 2013/0190032 | A1 | 7/2013 | Li |
| 2013/0275492 | A1 | 10/2013 | Kaufman et al. |
| 2013/0311591 | A1 | 11/2013 | Zacke et al. |

(Continued)

OTHER PUBLICATIONS

Syed, et al., "An Adaptive Framework for Multimedia Messaging Services over Wireless Networks and the Internet", In IEEE Canadian Conference on Electrical and Computer Engineering, vol. 2, May 4, 2003, 6 pages.

(Continued)

*Primary Examiner* — Suraj Joshi

(57) ABSTRACT

Disclosed herein are systems, methods, and software for providing enhanced reliability for web services. In an implementation, a proxy service supports web services provided by a client application to at least an online service. While the client application is temporarily disconnected from the proxy service, the proxy service monitors for web services activity to occur in association with the web services provided by the client application to at least the online service. In response to the client application reconnecting to the proxy service after having been temporarily disconnected from the proxy service, the proxy service communicates activity information to the client application indicative at least of whether or not to query the online service with respect to the web services activity.

20 Claims, 9 Drawing Sheets

(56) References Cited

U.S. PATENT DOCUMENTS

2014/0112232 A1  4/2014  Lu et al.

OTHER PUBLICATIONS

"User Notifications", Published on: Jul. 19, 2013, Available at: http://developer.android.com/google/gcm/notifications.html.
"International Search Report & Written Opinion Issued in PCT Application No. PCT/US2015/026968", dated Oct. 14, 2015, 14 Pages.
"International Preliminary Report on Patentability Issued in PCT Application No. PCT/US2015/026968", dated Apr. 22, 2014, 9 Pages.

* cited by examiner

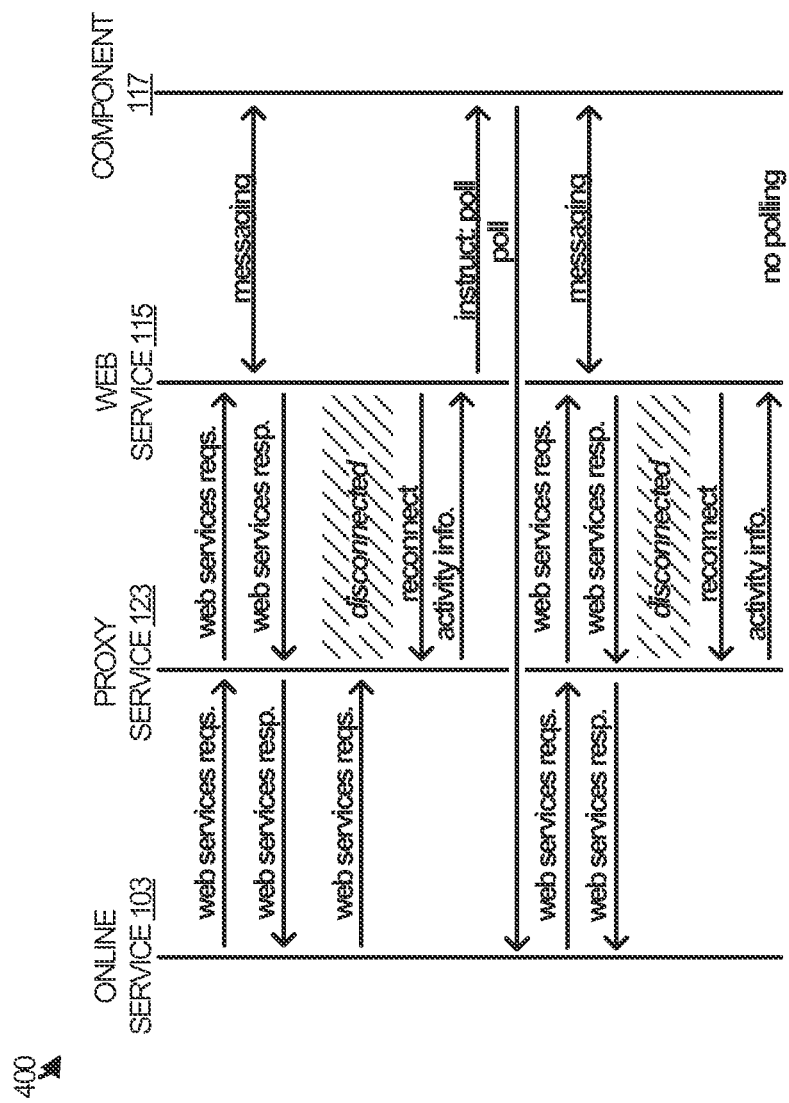

ENHANCED RELIABILITY FOR CLIENT-BASED WEB SERVICES

TECHNICAL FIELD

Aspects of the disclosure are related to computing hardware and software technology, and in particular, to enhanced reliability for client-based web services.

TECHNICAL BACKGROUND

Web services may be understood as a distributed computing technology that allows for the creation of platform and language independent client-server applications. Web services are commonly used to distribute information for other software and devices to consume, not humans, although such information may eventually be published in a human-consumable form, such as a website or other such formats.

In a brief example of a web service, a client contacts a web service in a server by sending a service request asking for information. The server returns the information through a service response. The service request may be an HTTP (hypertext transfer protocol) request, for instance, while the service response may also be an HTTP message, although other protocols can be used. Web services are popular for implementing Internet-scale applications and may in some cases involve other protocols in addition to HTTP, such as WSDL (web services description language) for describing a web service and SOAP (simple object access protocol) for formatting web services messages.

Servers commonly use web services to exchange information and conduct transactions with each other where one server acts as the server-side of an exchange while another server acts as the client-side of an exchange. Client applications, such as web browsers, may also interact with servers via web services. Clients can function as the server-side of a web-services exchange, but usually act as the client-side because of the difficulty associated with contacting client applications behind firewalls or other mechanisms.

It is possible to implement the server-side of a web services exchange in a client application using a proxy service or some other intermediate function to facilitate the exchange of web services communications between the client application and a server. In such scenarios, a proxy service may represent a web service running in a client application to the world such that other elements may reach the client application through the web service. In an example, a voice calling application may include a web service. A proxy service may act as an intermediary through which a calling service can reach the web service to notify the voice calling application of incoming calls and other activity.

OVERVIEW

Provided herein are systems, methods, and software for implementing enhanced reliability for client-based web services. In at least one implementation, a proxy service supports web services provided by a client application to at least an online service. While the client application is temporarily unavailable to the proxy service, the proxy service monitors for web services activity to occur in association with the web services provided by the client application to at least the online service. In response to the client application returning to the proxy service after having been temporarily unavailable to the proxy service, the proxy service communicates activity information to the client application indicative at least of whether or not to query the online service with respect to the web services activity. Depending on the activity information, the client application may query the online service or may refrain from doing so.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 4 illustrates an operational sequence in an implementation.

TECHNICAL DISCLOSER

Figure 1:
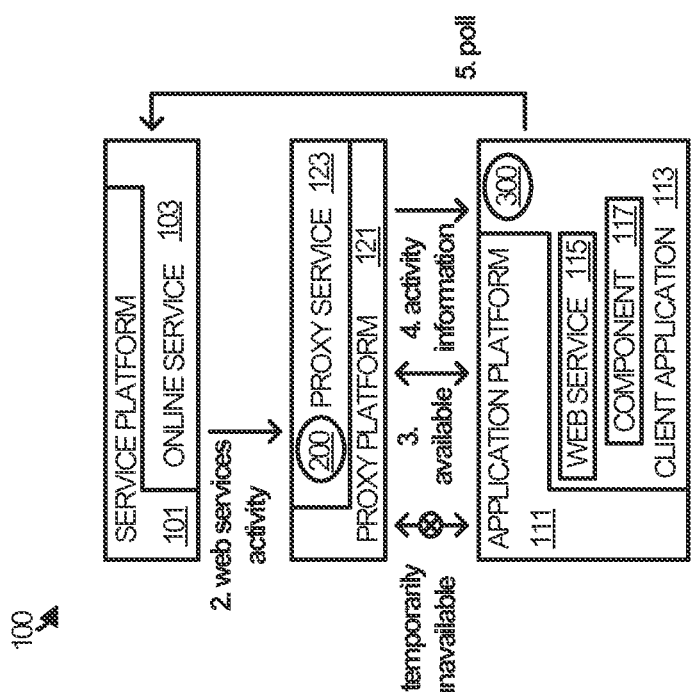
FIG. 1 illustrates a service architecture in an implementation.

Implementations disclosed herein enable the reliability of client-based web services to be enhanced such that they may be better suited for various types of services that, heretofore, had not taken advantage of their qualities.

Various aspects of a client application may be exposed to an online service via web services, the reliability of which is enhanced by a proxy service that assists with connecting the client application to the online service. Optimally, the client application maintains its availability to the proxy service such that incoming web services activity received by the proxy service can be communicated to the client application.

However, network traffic constraints or other events may cause the client application to become temporarily disconnected from the online service (and from the proxy service), or to become otherwise unavailable. For instance, the client application may lose TCP (transmission control protocol) connectivity. In another example, connectivity may be maintained, but the client application may transition to a dormant or background state on a device such that it is unavailable to the online service.

Upon returning from an unavailable state, the client application would not ordinarily know whether or not any web services activity occurred while it was unavailable, prompting the client application to poll the online service for updates regardless of what actually occurred. However, such polling occupies resources of the client application and device, network resources, and resources of the online service.

In at least one implementation, the proxy service enhances the reliability of web services by monitoring for web services activity to occur while the client application is temporarily unavailable. Upon the client application returning to the proxy service after having been temporarily unavailable, the proxy service communicates activity information to the client application indicative of whether or not to query the online service with respect to any web services activity that was missed.

The activity information may indicate to the client application whether or not to query the online service in a variety of ways. For instance, the activity information may simply indicate whether or not web services activity occurred, in which case the client application can apply its own logic to determine whether or not to query the online service. In another example, the activity information may include a flag or some other instruction that specifically directs the client application to query the online service. Other mechanisms, variations, or combinations are possible and may be considered within the scope of the present disclosure.

The activity information may indicate to the client application to query the online service after having been temporarily disconnected during a period of time during which the web services activity occurred, or after having been in a background mode when web services activity occurred. However, the activity information may alternatively indicate to the client application to refrain from querying the online service after having been temporarily unavailable during another period of time during which no web services activity occurred. Thus, the client application may retrieve missed messages or other information that the online service attempted to deliver via web services functionality during the period of temporary unavailability. In the event that no web services activity occurred, the client application may refrain from polling the online service, thereby conserving resources and possibly improving other aspects of its performance.

In some implementations, the proxy service monitors for when the client application transitions from being temporarily disconnected from the proxy service to fully disconnected from the proxy service. In such scenarios, the activity information may be indicative to the client application to query the online service with respect to the web services activity when reconnecting to the proxy service after having been fully disconnected, regardless of whether or not any web services activity occurred while the client application was temporarily disconnected. In a more general sense, the proxy service may also monitor for when the client application transitions from being temporarily unavailable to fully unavailable, whether or not the unavailability is due to the client application being disconnected, in a background mode, or for some other reason.

The online service may include various sub-services in some implementations. The client application may include various components that correspond to the sub-services. The client application may also include a web service for exposing functionality of each of the components through the web services to the sub-services. Examples of the sub-services include, but are not limited to, a voice calling service and an instant messaging service. Examples of the components include, but are not limited to, a voice calling client, an instant messaging client, and a voice mail client.

In various scenarios the activity information may include a request path associated with one of the services. One of the components may then query the online service with respect to the web services activity using the request path. Multiple request paths may be included in the activity information in the event that multiple requests are received while a client application is temporarily disconnected or otherwise unavailable. In other scenarios the activity information may include a flag set to indicate whether or not to query the online service with respect to the web services activity.

Figure 3:
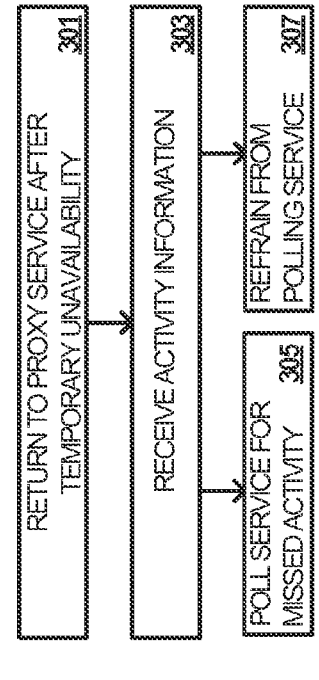
FIG. 3 illustrates a process employed by a client application in an implementation.
Figure 2:
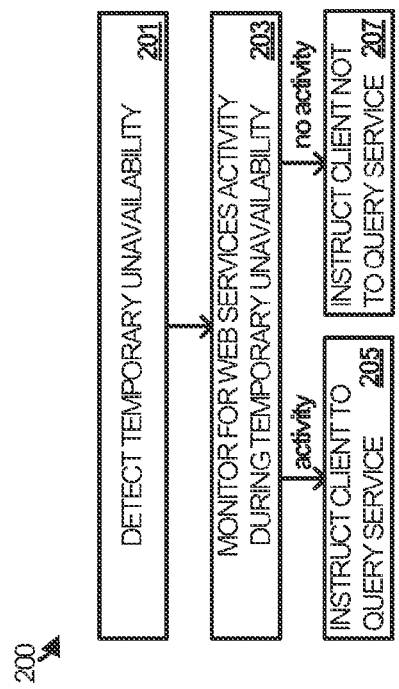
FIG. 2 illustrates a process performed by a proxy service in an implementation.
Figure 5:
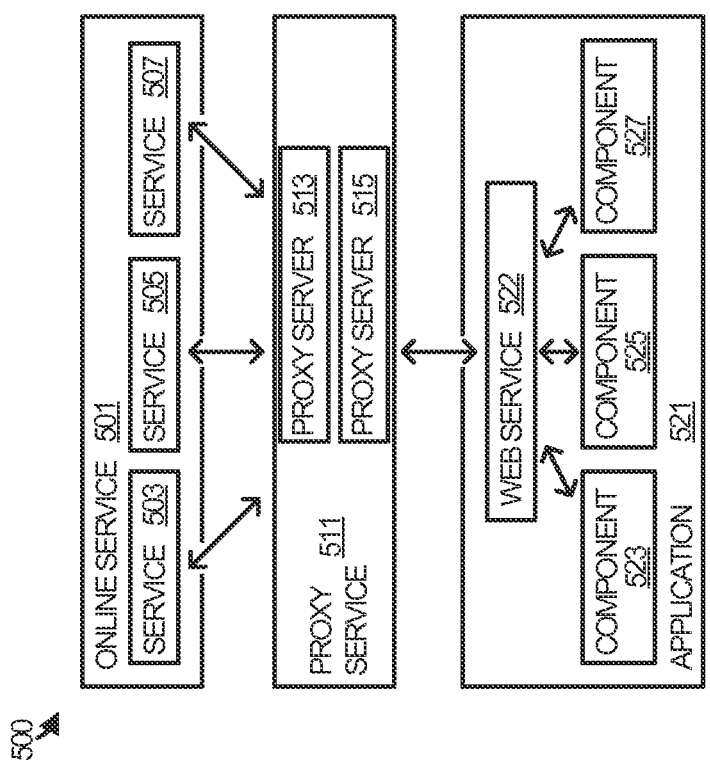
FIG. 5 illustrates another service architecture in an implementation.
Figure 6:
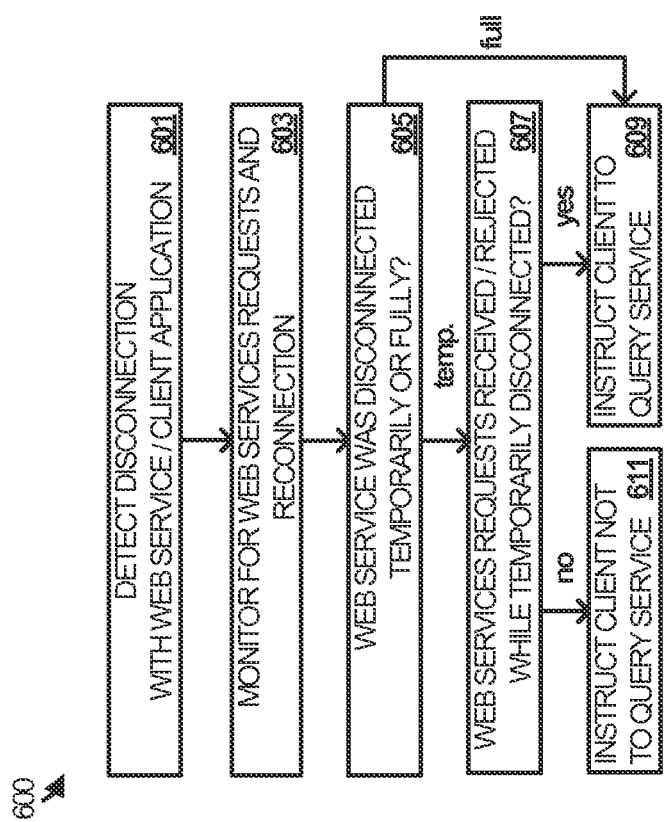
FIG. 6 illustrates a process performed by a proxy in an implementation.
Figure 7:
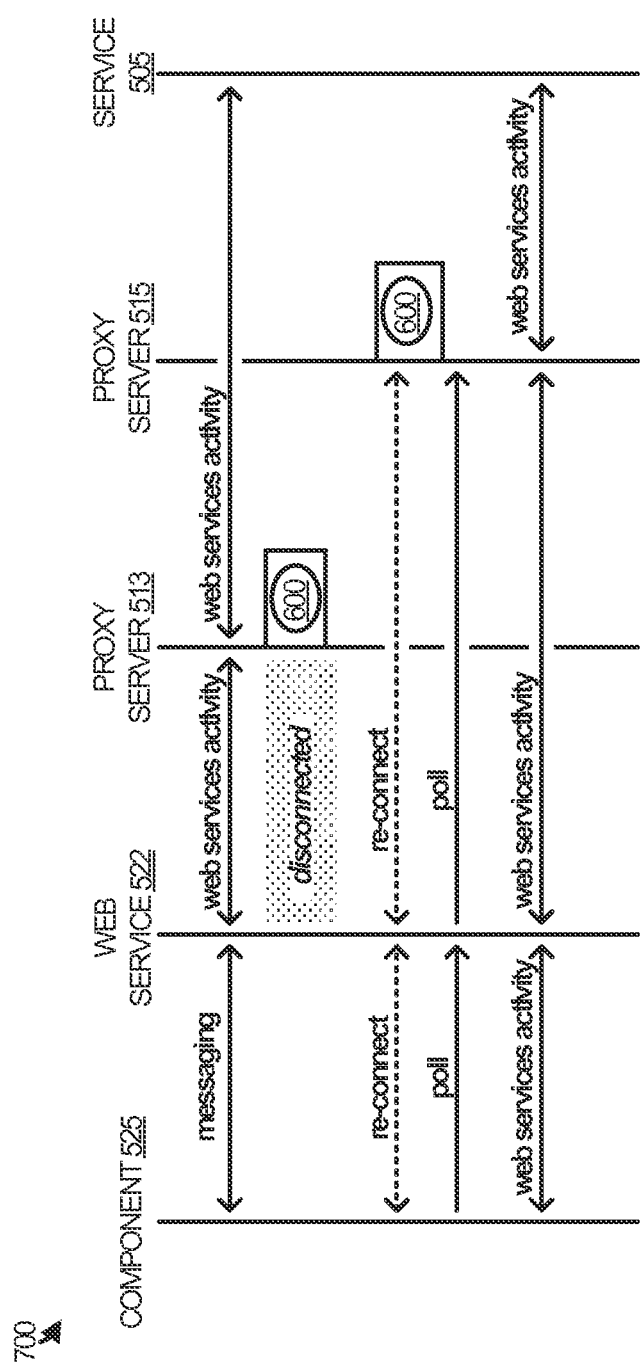
FIG. 7 illustrates an operational sequence in an implementation.
Figure 8:
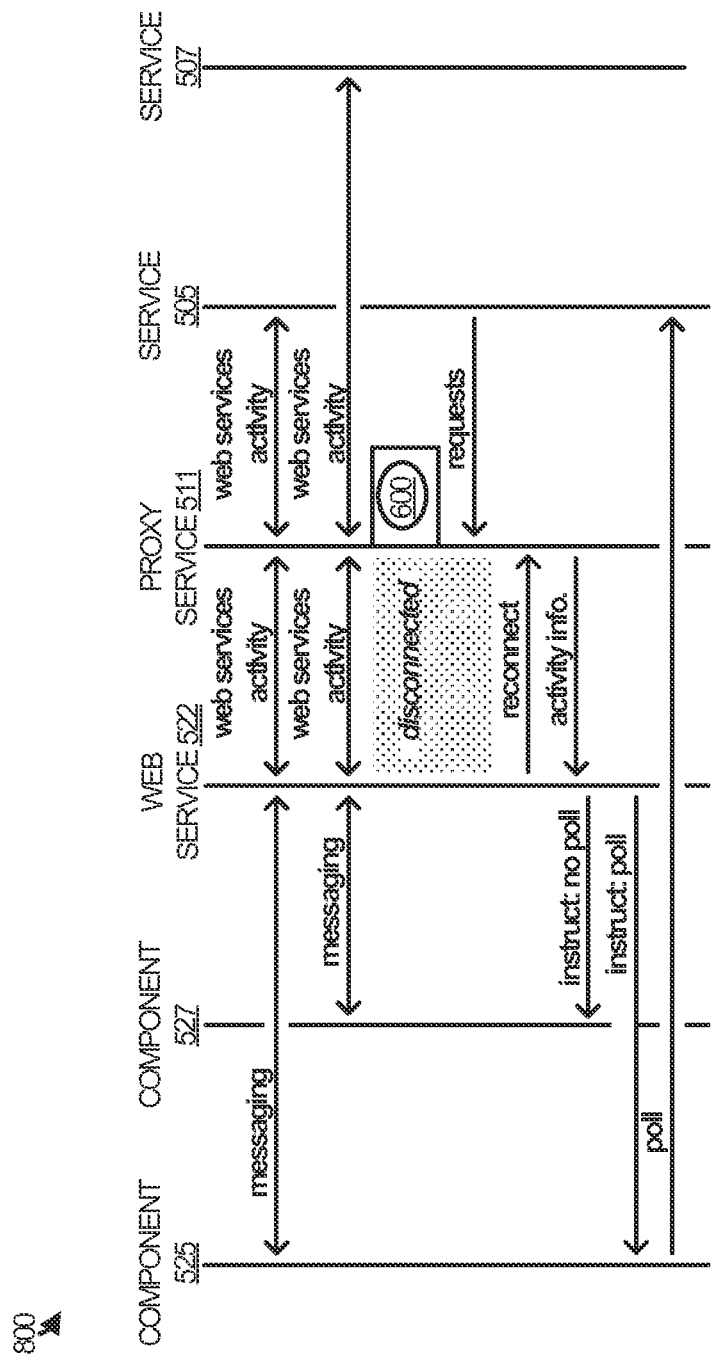
FIG. 8 illustrates an operational sequence in an implementation.
Figure 9:
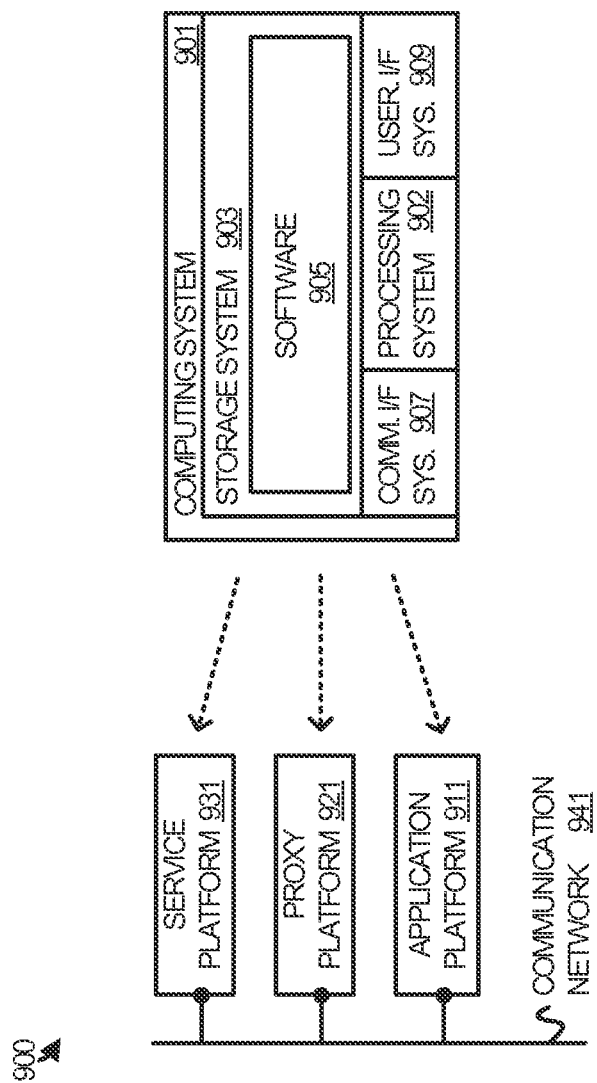
FIG. 9 illustrates computing environment in an implementation.
Figure 10B:
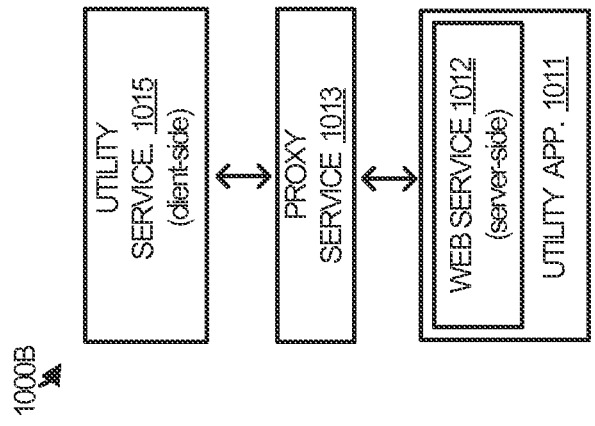
FIGS. 10A-B illustrates use cases in various implementations.
Figure 10A:
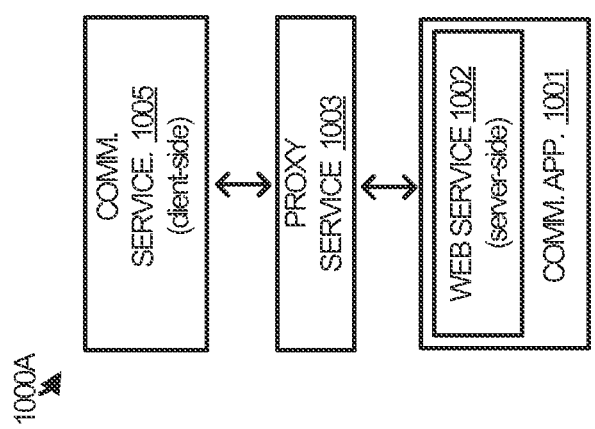

Referring now to the drawings, FIG. 1 illustrates a service architecture in which a proxy service and web service provide enhanced reliability for web services. FIG. 2 illustrates a process employed by the proxy service, while FIG. 3 illustrates a process employed by a client application that hosts the web service. FIG. 4 illustrates an operational sequence to further demonstrate enhanced reliability for web services. FIG. 5 illustrates another service architecture, while FIGS. 6-8 illustrate various operations of the service architecture. FIG. 9 illustrates a computing environment in which the various service architectures, processes, and operational scenarios and sequences discussed with respect to FIGS. 1-8 may be implemented. FIG. 10A and FIG. 10B illustrate various use cases for the principles disclosed in FIGS. 1-9.

Turning now to FIG. 1, service architecture 100 includes service platform 101, application platform 111, and proxy platform 121. Online service 103 is implemented on service platform 101 and client application 113 and proxy service 123 are implemented on application platform 111 and proxy platform 121 respectively. Client application 113 includes web service 115 and component 117.

In operation, client application 113 communicates with online service 103 through web service 115 and proxy service 123. Web service 115 allows various aspects of client application 113 to be accessed by online service 103 as a web service, such as component 117 and other components, modules, features, or functionality. Proxy service 123 allows online service 103, and possibly other services, to reach web service 115, even though it is implemented in a client application, providing a publicly routable address to online service 103 or the other services.

Online service 103 communicates web services requests to web service 115 using an address that routes the requests to proxy service 123. Proxy service 123 communicates the requests to web service 115 when web service 115 is connected and available. The requests or messages included in the requests may then be handled by client application 113. However, at times web service 115 may become temporarily unavailable to proxy service 123, during which web services activity occurs. For instance, communication connectivity between client application 113 and proxy service 123 may be lost, or client application 113 may have transitioned to a background mode on application platform 111.

During those times, online service 103 may initiate various service requests. Proxy service 123 monitors for such activity and, upon web service 115 returning to proxy service 123, communicates activity information to web service 115 that represents whether or not any activity occurred. Web service 115 returns to proxy service 123 when, for example, connectivity is re-established or client application 113 returns to the foreground on application platform 111.

In a situation where client application 113 returns to the foreground from the background, client application 113 may have taken such action in response to a variety of events. In one example, client application 113 may return to the foreground in response to a local event, such as a user navigating to client application 113 on their device, client application 113 periodically waking up, or in response to some other local event.

However, client application 113 may be prompted to return to the foreground by proxy service 123 in some situations. In various implementations proxy service 123 may be capable of monitoring for high-priority web services requests, as distinguished from lower priority web services requests. During a period of unavailability due to client application 113 being in the background, proxy service 123 may "wake up" client application 113 upon receipt of high priority requests, while allowing client application 113 to remain in the background when low priority requests are received.

Web service 115 receives the activity information and prompts client application 113 to poll online service 103 for any missed messages or other information associated with the web services activity that occurred while web service 115 was temporarily unavailable to online service 103. Online service 103 can reply with the missed messages, requests, or other information associated with the web services activity such that client application 113 is able to update its state.

In some scenarios, the activity information indicates that no web services activity was missed while web service 115 was disconnected from proxy service 123, in which case web service 115 does not prompt client application 113 to poll online service 103. By refraining from polling online service 103, client application 113 conserves resources, such as processing power, communication bandwidth, and the like.

FIG. 2 illustrates process 200 employed by proxy service 123 to enhance the reliability of web services. In operation, proxy service 123 detects a state of temporary unavailability with respect to web service 115 (step 201). The temporary unavailability may occur for a variety of reasons, such as poor network connectivity, congestion, a transition from the foreground to the background on a device, or for other reasons. Proxy service 123 monitors for web services activity during the period of temporary unavailability (step 203). Such monitoring may include noting when web services requests are received by maintaining a flag, keeping a list of request paths, or in some other manner.

Upon web service 115 returning to proxy service 123, proxy service 123 instructs client application 113 to either query online service 103 or not query online service 103 depending upon whether or not any web services activity occurred while web service 115 was temporarily unavailable. If activity did occur, then proxy service 123, via web service 115, instructs client application 113 to query online service 103 for the missed message or other information (step 205). If activity did not occur, then proxy service 123, via web service 115, instructs client application 113 to refrain from querying online service 103 (step 207), at least with respect to having recovered from the temporary unavailability.

FIG. 3 illustrates process 300 employed by client application 113 to enhance the reliability of web services. In some cases process 300 may be employed by web service 115, while in other cases process 300 may be employed by other elements of client application 113. Process 300 may also be distributed across multiple elements of client application 113 or other software, such as operating system elements.

In operation, web service 115 reconnects to proxy service 123 after being temporarily unavailable (step 301). Web service 115 receives activity information communicated by proxy service 123 that is instructive of whether or not client application 113 is to poll online service 103 (step 303). If so, then client application 113 queries online service 103 for messages that may have been missed during the temporary unavailability (step 305). If not, client application 113 refrains from querying online service 103, at least with respect to having returned from the temporarily unavailable state.

FIG. 4 illustrates an operational sequence 400 in an implementation to further demonstrate various principles of enhanced reliability. Operational sequence 400 generally refers to a scenario in which web service 115 becomes disconnected with respect to proxy service 123, although the principles described apply as well to other types of unavailability, such as when an application transitions between background and foreground states.

In operation, online service 103 initiates web services requests that are communicated to web service 115. Web service may communicate with component 117 to generate responses to the requests, which are then provided to online service 103 while web service 115 remains connected.

However, a period of disconnection may occur between web service 115 and proxy service 123 during which web services requests are still received by proxy service 123. Upon reconnecting, proxy service 123 provides activity information to web service 115 indicative of whether or not to poll online service 103 to update the state of client application 113 with respect to the service. In this example, web services activity occurred during the period of disconnection and thus the activity information is instructive that client application 113 poll online service 103. Accordingly, web service 115 provides an instruction or some other indication of the same to component 117. Component 117 responsively polls online service 103 for messages or some other information with which the state of client application 113 may be brought current.

Further in this scenario, client application 113 may engage with online service 103 during a period in which web service 115 is connected to proxy service 123. While connected, online service 103 obtains information from component 117 or provides information to component 117 by exchanging web services requests and responses with web service 115 through proxy service 123. However, web service 115 again experiences a period of disconnection with proxy service 123. During that time, proxy service 123 monitors for web service activity and, upon reconnecting to web service 115, provides activity information indicative of whether or not any web services activity occurred.

In this example, no web services activity occurred while web service 115 was disconnected from proxy service 123. Accordingly, web service 115 does not prompt component 117 to poll online service 103, at least with respect to updating its state after the period of disconnection.

Referring back to FIG. 1, service platform 101 is representative of any physical or virtual computing system, device, or collection thereof capable of hosting all or a portion of online service 103. Examples of service platform 101 include, but are not limited to, server computers, rack servers, blade servers, or virtual machine servers, as well as any other type of computing system, of which service platform 931 illustrated FIG. 9 is representative. In some scenarios, online service 103 may be implemented in a data center, a virtual data center, or in some other suitable computing facility. Examples of online service 103 include, but are not limited to, calling services, chat services, messaging services, blog services, micro-blogging services, social networking services, e-commerce services, and gaming services, as well as any other type of service, combination of services, or variations thereof. Online service 103 may sometimes be referred to as a cloud service, an Internet service, an information service, or the like.

Proxy platform 121 is representative of any physical or virtual computing system, device, or collection thereof capable of hosting all or a portion of proxy service 123. Examples of proxy platform 121 include, but are not limited to, server computers, rack servers, blade servers, or virtual machine servers, as well as any other type of computing system, of which proxy platform 921 illustrated in FIG. 9 is representative. In some scenarios, proxy service 123 may be implemented in a data center, a virtual data center, or in some other suitable computing facility. Proxy platform 121, and by implication proxy service 123, may be co-located with respect to service platform 101 and online service 103, or may be distributed relative to service platform 101 and online service 103.

Application platform 111 is representative of any physical or virtual computing system, device, or collection thereof capable of running client application 113 and supporting web services. Examples of application platform 111 include, but are not limited to, smart phones, laptop computers, tablet computers, desktop computers, hybrid computers, gaming machines, virtual machines, televisions, watches and other wearable devices, industrial devices, and facility appliances (such as thermostats), as well as any variation or combination thereof, of which application platform 911 in FIG. 9 is representative.

Client application 113 is representative of any software application, suite of applications, module, component, or collection thereof, capable of communicating with online service 103. Examples of client application 113 include, but are not limited to, web browser applications, voice calling applications, instant messaging applications, other real-time communication applications, blogging and micro-blogging applications, social networking applications, e-commerce applications, industrial applications, facility monitoring applications, and gaming applications, as well as any other type of application. Client application 113 may be a locally installed and executed application, a streaming application, a mobile application, or any combination or variation thereof. In some implementations, client application 113 may be a browser-based application that executes in the context of a browser application. Client application 113 may be implemented as stand-alone application or may be distributed across multiple applications.

It may be appreciated from the foregoing discussion of service architecture 100 and its associated operations that the reliability of web services is enhanced by proxy service 123 informing web service 115 about web services activity that may have been missed while web service 115 was temporarily unavailable with respect to at least proxy service 123. In addition, by allowing client application 113 to refrain from polling online service 103 upon connectivity being re-established after a temporary disconnection, the user experience may be improved in some scenarios by conserving battery life and reducing traffic congestion.

At least some of these aspects may also be appreciated with respect to service architecture 500 and its associated operations, which are illustrated in FIGS. 5-8. Referring to FIG. 5, service architecture 500 includes online service 501, proxy service 511, and application 521 in an implementation. Online service 501 includes various sub-services, represented by service 503, service 505, and service 507. Proxy service 511 includes various proxy servers, represented by proxy server 513 and proxy server 515. Application 521 includes web service 522 and various components, represented by component 523, component 525, and component 527.

In operation, services 503, 505, and 507 exchange application messaging with components 523, 525, and 527. The application messaging is communicated over web services transport communications, such as HTTP messages, exchanged between services 503, 505, and 507 and web service 522. The web services transport communications are exchanged through proxy service 511, and in particular through whichever one of proxy server 513 and proxy server 515 is connected to web service 522 at a given time. Web service 522 receives incoming web services requests, processes them, and then communicates as needed with an appropriate one of components 523, 525, and 527. In the reverse direction, components 523, 525, and 527 may communicate with services 503, 505, and 507 through web service 522 and proxy service 511, although in some scenarios components 523, 525, and 527 may communicate directly with the services 503, 505, and 507.

FIG. 600 illustrates process 600 that may be employed by a proxy server in proxy service 511, such as proxy server 513 or proxy server 515. Process 600 generally refers to a scenario in which a web service becomes disconnected with respect to a proxy service, although the principles described apply as well to other types of unavailability, such as when an application transitions between background and foreground states.

In operation, the proxy server detects that a web service running within a client application has become disconnected from the proxy server (step 601). The proxy server may start a timer or perform some other function that allows it to determine later whether or not the web service was temporarily or fully disconnected. In the meantime, the proxy server monitors for incoming web services activity directed to the disconnected web service (step 603).

Eventually, the web service reconnects to the proxy server, at which time the proxy server determines whether or not the web service was temporarily or fully disconnected (step 605). For instance, if the web service was disconnected for a duration that exceeded a threshold amount of time, then the web service could be considered fully disconnected. However, if the web service was disconnected for a duration that was less than the threshold, then the web service could be considered temporarily disconnected. In another example, if the web service was connecting to a proxy server after having been disconnected from a different proxy server, then the web service could be considered fully disconnected regardless of the duration for which it was disconnected.

If a web service is determined to have been fully disconnected, then the proxy server instructs that the client application in which the web service runs poll an associated online service in order to update the state of the client application, regardless of whether any web services activity occurred while the web service was disconnected (Step 609). However, if the web service was determined to have been temporarily disconnected, then the proxy server analyzes whether or not any web services requests were received during the temporary disconnection (step 607). If web services requests were received, then the proxy server instructs that the client application query the online service to update its state (step 609). If web services requests were not received, then the proxy server provides an indication to the web service that that the client application can refrain from polling the online service, at least with respect to having reconnected to the proxy server (step 611).

In some scenarios, a third state after step 607 may also be possible where the proxy server is not sure about the occurrence of web services requests while the client application was temporarily disconnected. For instance, the proxy server may have lost state before the client application returns from being temporarily disconnected. Thus, the proxy server would provide an indication to the client application to poll the online service because it cannot say for certain that no web services activity occurred while the client application was temporarily disconnected.

In still other scenarios, a client application may be considered fully disconnected just by virtue of the proxy server losing state. For instance, even though a period of disconnection could be considered a temporary disconnection, if the proxy server loses state, then the end result from the perspective of the client application is the same as if it had been fully disconnected—the proxy server is unable to tell the client application for certain whether or not web services activity occurred.

FIG. 7 illustrates an operational sequence 700 that demonstrates enhanced reliability in an implementation with respect to service architecture 500. Operational sequence 700 generally refers to a scenario in which a web service becomes disconnected with respect to a proxy service, although the principles described apply as well to other types of unavailability, such as when an application transitions between background and foreground states.

In operation, component 525 exchanges communications with service 505 via web service 522 and proxy server 513. The communications exchanged between component 525 and web service 522 may include application messaging that is delivered over web services requests and responses exchanged between web service 522 and service 505 through proxy server 513.

Web service 522 may become disconnected from proxy server 513 at some point in operation due to network connectivity problems, congestion, local processing errors, or some other event that causes the disconnection. Proxy server 513 is capable of employing process 600, described with respect to FIG. 6, which it performs upon detecting the disconnection. However, in this example sequence web service 522 reconnects after the disconnection to proxy server 515. As such, proxy server 513 does not instruct web service 522 one way or another with respect to polling service 505.

Proxy server 515 is also capable of employing process 600. Thus, when web service 522 reconnects to proxy service 511, but through proxy server 515, web service 522 is instructed to poll service 505. Component 525 polls service 505 accordingly in order to update its state. It may be appreciated that such polling occurs regardless of whether or not any web services activity occurred while web service 522 was disconnected. In addition, such polling occurs regardless of whether the disconnection was temporary or full. This is because web service 522 reconnects to proxy service 511 through a different server.

FIG. 8 illustrates another operational sequence 800 that further demonstrates enhanced reliability for web services with respect to service architecture 500. Operational sequence 800 generally refers to a scenario in which a web service becomes disconnected with respect to a proxy service, although the principles described apply as well to other types of unavailability, such as when an application transitions between background and foreground states.

In operation, component 525 exchanges communications with service 505 via web service 522 and proxy service 511. The communications exchanged between component 525 and web service 522 may include application messaging or information that is delivered over web services requests and responses exchanged between web service 522 and service 505 through proxy service 511.

Further in this sequence, component 527 exchanges communications with service 507 via web service 522 and proxy service 511. The communications exchanged between component 525 and web service 522 may include application messaging or information that is delivered over web services requests and responses exchanged between web service 522 and service 507 through proxy service 511.

At some point during operation, web service 522 becomes disconnected from proxy service 511. Proxy service 511 is capable of employing process 600, described with respect to FIG. 6. As such, proxy service 511 monitors for incoming web services requests from service 505 and service 507 destined for component 525 or component 527 respectively. Upon a connection being re-established with web service 522, proxy service 511 may provide activity information to web service 522 indicative of whether or not web services activity occurred on a per-component basis for component 525 and component 527.

In this example, service 505 made web services requests that were received and rejected by proxy service 511 while web service 522 was disconnected, but service 507 made no such requests. The activity information provided to web service 522 is therefore instructive that component 525 poll service 505, while component 527 may refrain from polling service 507. In this manner, traffic is reduced as only one of the two components queries for service updates and other messaging. In addition, battery life and other processing resources may be conserved.

Referring back to FIG. 5, online service 501 may be implemented on any physical or virtual computing system, device, or collection thereof capable of hosting all or a portion of online service 501. Examples include, but are not limited to, server computers, rack servers, blade servers, or virtual machine servers, as well as any other type of computing system, of which service platform 931 illustrated in FIG. 9 is representative. In some scenarios, online service 501 may be implemented in a data center, a virtual data center, or in some other suitable computing facility. Examples of online service 501 include, but are not limited to, calling services, chat services, messaging services, blog services, micro-blogging services, social networking services, e-commerce services, and gaming services, as well as any other type of service, combination of services, or variations thereof. Online service 501 may sometimes be referred to as a cloud service, an Internet service, an information service, or the like. One specific example of online service 501 is Skype™ from Microsoft®.

Proxy server 513 and proxy server 515 are each representative of any physical or virtual computing system, device, or collection thereof capable of hosting all or a portion of proxy service 511. Examples of proxy server 513 and proxy server 515 include, but are not limited to, server computers, rack servers, blade servers, or virtual machine servers, as well as any other type of computing system, of which proxy platform 921 illustrated in FIG. 9 is representative. In some scenarios, proxy service 511 may be implemented in a data center, a virtual data center, or in some other suitable computing facility. Proxy service 511 may be implemented separately or in an integrated manner with respect to online service 501.

Application 521 is representative of any software application, suite of applications, module, component, or collection thereof, capable of communicating with online service 501. Application 521 may be implemented on any physical or virtual computing system, device, or collection thereof capable of running application 521 and supporting web services. Examples include, but are not limited to, smart phones, laptop computers, tablet computers, desktop computers, hybrid computers, gaming machines, smart televisions, and virtual machines, as well as any variation or combination thereof, of which application platform 911 in FIG. 9 is representative.

Examples of application 521 include, but are not limited to, web browser applications, voice calling applications, instant messaging applications, other real-time communication applications, blogging and micro-blogging applications, social networking applications, e-commerce applications, and gaming applications, as well as any other type of application. Application 521 may be a locally installed and executed application, a streaming application, a mobile application, or any combination or variation thereof. In some implementations, application 521 may be a browser-based application that executes in the context of a browser application. Application 521 may be implemented as a stand-alone application or may be distributed across multiple applications. One specific example of application 521 is the Skype™ client application from Microsoft®.

FIG. 9 illustrates computing environment 900, which includes computing system 901 that is representative of one or more computing systems or devices that may be used to implement at least application platform 911 and proxy platform 921. Various use cases may be carried out in computing environment 900, several of which are described with respect to FIGS. 10A and 10B.

Use case 1000A in FIG. 10A relates to a scenario in which a communication application 1001 employs a web service 1002 to communicate through a proxy service 1003 with a communication service 1005. Web service 1002 is employed as the server-side of a web services exchange, whereas communication service 1005 acts as the client-side of the exchange. Examples of communication application 1001 include any real-time or near real-time communication applications that allow users to communicate by voice, video, instant messaging, chat, group chat, or in any other way. Thus, communication service 1005 may be any real-time or near real-time communication service, including voice and video calling services, unified communication services, and the like.

In operation, a URL (uniform resource locator) is published for web service 1002 running in communication application 1001 to other devices or services. Communication service 1005 may attempt to reach communication application 1001 by using the URL associated with web service 1002. In particular, communication service 1005 may send HTTP requests that include the URL for web service 1002. Web service 1002 may provide its URL to proxy service 1003 during a registration phase or proxy service 1003 may obtain it in some other way.

Assuming web service 1002 is connected and available to proxy service 1003, web service 1002 will receive any HTTP requests sent by communication service 1005 and can reply in return with HTTP responses. The HTTP responses may include information used by an upper layer in communication application 1001 to carry out a phone call or other communication session with communication service 1005. For example, the HTTP responses may be populated with SIP (session initiation protocol) messages or other similar information. Likewise, the HTTP requests sent by communication service 1005 may include upper-layer messaging that allows sessions to be established between communication service 1005 and communication application 1001. It may be appreciated that the HTTP responses may not flow through proxy service 1003, although such a configuration is possible.

However, at times web service 1002 may become disconnected from or simply unavailable to proxy service 1003. This may occur due to network congestion, link failure, a transition to a dormant or background mode, or for some other reason. While the unavailability persists, proxy service 1003 monitors for incoming HTTP requests from communication service 1005. Any requests that are received may be rejected, but proxy service 1003 also notes that they occurred, and possibly tracks them, so that when web service 1002 reconnects or re-establishes its availability, information about the occurrence may be provided.

Thus, upon web service 1002 returning to proxy service 1003, proxy service 1003 provides activity information that indicates whether or not any requests were received while web service 1002 was unavailable. Such information is provided if the unavailability is considered temporary. If requests were received, then web service 1002 (or some other element in communication application 1001) queries communication service 1005 to update its state. However, if no requests were received, then polling is not necessary, at least with respect to updating state after the reconnect.

In a scenario in which unavailability is caused by a disconnection, it may be considered a temporary disconnection when it lasts for less than a certain amount of time, for example. If the disconnection lasts so long that it becomes a full or permanent disconnection, then proxy service 1003 ceases to maintain any history or state information for web service 1002. Accordingly, when web service 1002 reconnects after a full disconnect, it is directed to poll communication service 1005 for a state update.

Use case 1000B in FIG. 10B relates to a scenario in which a utility application 1011 employs a web service 1012 to communicate through a proxy service 1013 with a utility service 1015. Web service 1012 is employed as the service-side of a web services exchange, whereas utility service 1015 acts as the client-side of the exchange. Examples of utility application 1011 include any application that may interface with energy sensors or other equipment, such as thermostats, electricity meters, home appliances, industrial appliances, or the like. Thus, utility service 1015 may be any service capable of requesting and receiving utility-specific information, such as usage information, performance information, telemetric data, or any other type of utility data.

In operation, proxy service 1013 publishes a URL for web service 1012 running in utility application 1011 to other devices or services. Utility service 1015 may attempt to reach utility application 1011 by using the URL associated with web service 1012. For instance, utility service 1015 may send HTTP requests that include the URL for web service 1012.

Assuming web service 1012 is connected to proxy service 1013, web service 1012 will receive any HTTP requests sent by utility service 1015 and can reply in return with HTTP responses. The HTTP responses may include utility information, such as energy usage, temperature statistics, or any other information that may be requested. It may be appreciated that the HTTP responses may not flow through proxy service 1013, although such a configuration is possible.

However, at times web service 1012 may become disconnected from proxy service 1013 or may be in some other state where incoming traffic is not desired. While the disconnection or other state persists, proxy service 1013 monitors for incoming HTTP requests from communication service 1015. Any requests that are received may be rejected, but proxy service 1013 records that they occurred to ensure that when web service 1012 reconnects information about the occurrence may be provided.

Upon web service 1012 reconnecting to proxy service 1013, proxy service 1013 provides activity information that indicates whether or not any requests were received while web service 1012 was disconnected. Such information is provided if the disconnection is considered a temporary disconnection. If requests were received, then web service 1012 (or some other element in utility application 1011) queries utility service 1015 to update its state. However, if no requests were received, then polling is not necessary, at least with respect to updating state after the reconnect.

Referring back to FIG. 9, application platform 911 is representative of any computing apparatus, system, device, or collections thereof suitable for implementing a client application and a web service. Examples of application platform 911 include, but are not limited to, smart phones, laptop computers, tablet computers, desktop computers, hybrid computers, gaming machines, virtual machines, televisions, watches and other wearable devices, industrial devices, and facility appliances (such as thermostats), as well as any variation or combination thereof.

Proxy platform 921 is representative of any computing apparatus, system, or collections thereof capable of implementing all or portions of a proxy service. Examples of proxy platform 921 include server computers, rack servers, web servers, cloud computing platforms, and data center equipment, as well as any other type of physical or virtual server machine, and any variation or combination thereof. In some implementations, a collection of multiple computing systems may be employed to implement all or portions of a proxy service which may be hosted in one or more data centers, virtual data centers, or any other suitable computing facilities.

Computing system 901 may be implemented as a single apparatus, system, or device or may be implemented in a distributed manner as multiple apparatuses, systems, or devices. Computing system 901 includes, but is not limited to, processing system 902, storage system 903, software 905, communication interface system 907, and user interface system 909. Processing system 902 is operatively coupled with storage system 903, communication interface system 907, and user interface system 909.

Processing system 902 loads and executes software 905 from storage system 903. When executed by processing system 902 to implement enhanced reliability for web services, software 905 directs processing system 902 to operate as described herein for the various processes, operational scenarios, and sequences discussed in the foregoing implementations of service architecture 100 and service architecture 500. Computing system 901 may optionally include additional devices, features, or functionality not discussed for purposes of brevity.

Referring still to FIG. 9, processing system 902 may comprise a microprocessor and other circuitry that retrieves and executes software 905 from storage system 903. Processing system 902 may be implemented within a single processing device but may also be distributed across multiple processing devices or sub-systems that cooperate in executing program instructions. Examples of processing system 902 include general purpose central processing units, application specific processors, and logic devices, as well as any other type of processing device, combinations, or variations thereof.

Storage system 903 may comprise any computer readable storage media readable by processing system 902 and capable of storing software 905. Storage system 903 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 903 may also include computer readable communication media over which software 905 may be communicated internally or externally. Storage system 903 may be implemented as a single storage device but may also be implemented across multiple storage devices or sub-systems co-located or distributed relative to each other. Storage system 903 may comprise additional elements, such as a controller, capable of communicating with processing system 902 or possibly other systems.

Software 905 may be implemented in program instructions and among other functions may, when executed by processing system 902, direct processing system 902 to operate as described with respect to the various operational scenarios, sequences, and processes illustrated herein. In particular, the program instructions may include various components or modules that cooperate or otherwise interact to carry out the various processes and operational scenarios described herein. The various components or modules may be embodied in compiled or interpreted instructions or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software or other application software. Software 905 may also comprise firmware or some other form of machine-readable processing instructions executable by processing system 902.

In general, software 905 may, when loaded into processing system 902 and executed, transform a suitable apparatus, system, or device (of which computing system 901 is representative) overall from a general-purpose computing system into a special-purpose computing system customized to facilitate enhanced reliability for web services as described herein for each implementation. Indeed, encoding software 905 on storage system 903 may transform the physical structure of storage system 903. The specific transformation of the physical structure may depend on various factors in different implementations of this description. Examples of such factors may include, but are not limited to, the technology used to implement the storage media of storage system 903 and whether the computer-storage media are characterized as primary or secondary storage, as well as other factors.

For example, if the computer readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Referring again to FIG. 1 as an example, through the operation of a computing system or systems of which computing system 901 is representative, transformations may be performed with respect to service architecture 100. As an example, application platform 111 may become temporarily disconnected, during which time web services activity occurs. Upon reconnecting, application platform 111 is informed about the activity and communicates with service platform 101 to obtain the activity and update (or change) its state to be consistent with the missed activity. Referring to FIG. 5, application 521 may become temporarily disconnected, during which time web services activity occurs. Upon reconnecting, application 521 is informed about the activity and communicates with online service 501 to obtain the activity and change its state.

It may be understood that computing system 901 is generally intended to represent a computing system or systems on which software 905 may be deployed and executed in order to implement enhanced reliability for web services. However, computing system 901 may also be suitable as any computing system on which software 905 may be staged and from where one or both may be distributed, transported, downloaded, or otherwise provided to yet another computing system for deployment and execution, or yet additional distribution.

Communication interface system 907 may include communication connections and devices that allow for communication with other computing systems (not shown) over communication network 941. Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 909 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 909. In some cases, the input and output devices may be combined in a single device, such as a display capable of displaying images and receiving touch gestures. The aforementioned user input and output devices are well known in the art and need not be discussed at length here.

User interface system 909 may also include associated user interface software executable by processing system 902 in support of the various user input and output devices discussed above. Separately or in conjunction with each other and other hardware and software elements, the user interface software and user interface devices may support a graphical user interface, a natural user interface, or any other type of user interface. In addition, user input made with respect to the user interfaces can be input via user interface system 909.

Communication between application platform 911, proxy platform 921, and service platform 931 and any other computing system occurs over communication network 941 or other networks and in accordance with various communication protocols, combinations of protocols, or variations thereof. Examples of communication network 941 include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in astute diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a proxy service to support web services provided by a client application to at least an online service, wherein the client application provides a server-side of the web services to the online service, the method comprising:
serving as a proxy for the server-side of the web services;
while the client application is temporarily unavailable to the proxy service, monitoring for web services activity to occur in association with the web services provided by the client application to at least the online service; and
in response to the client application becoming available to the proxy service after having been temporarily unavailable to the proxy service, communicating activity information to the client application indicative at least of whether or not to query the online service with respect to the web services activity.

2. The method of claim 1 wherein the activity information indicates to the client application to query the online service with respect to the web services activity when the client application returns to the proxy service after having been temporarily unavailable during a period of time during which the web services activity occurred.

3. The method of claim 2 wherein the activity information is indicative to the client application to refrain from querying the online service with respect to the web services activity when the client application returns to the proxy service after having been temporarily unavailable during another period of time during which no web services activity occurred.

4. The method of claim 3 wherein, when the client application is temporarily unavailable to the proxy service due to being temporarily disconnected from the proxy service, the activity information is indicative to the client application to query the online service with respect to the web services activity when the client application reconnects to the proxy service after having been fully disconnected from the proxy service regardless of whether or not any web services activity occurred while the client application was temporarily disconnected from the proxy service, and wherein the method further comprises:
monitoring for when the client application transitions from being temporarily disconnected from the proxy service to fully disconnected from the proxy service.

5. The method of claim 1 wherein the online service comprises a plurality of sub-services and the client application comprises a plurality of components corresponding to the plurality of sub-services and a web service for exposing functionality of each of the plurality of components through the web services to the plurality of sub-services.

6. The method of claim 5 wherein the activity information comprises a request path associated with one of the plurality of sub-services with which a one of the plurality of components queries the online service with respect to the web services activity.

7. The method of claim 5 wherein the plurality of sub-services comprises a voice calling service and an instant messaging service and wherein the plurality of components comprises a voice calling client and an instant messaging client.

8. The method of claim 1 wherein the activity information comprises a flag set to indicate whether or not to query the online service with respect to the web services activity upon the client application returning from being unavailable to the proxy service, wherein the client application returns from being unavailable when a transition occurs comprising at least one of reconnecting to the proxy service after being temporarily disconnected and returning to a foreground mode from a background mode.

9. A method for facilitating web services provided by client applications associated with online services, wherein the client applications provide a server-side of the web services to the online services, the method comprising:
in an online service, attempting to communicate a plurality of messages to a client application associated with the online service using a plurality of web services requests directed to at least a web service in the client application; and
in a proxy service for a server-side of the web services, and in response to the web service in the client application reconnecting to the proxy service after having missed at least one of the plurality of web services requests while temporarily unavailable to the proxy service, instructing the client application through the web service to poll the online service for at least a missed message of the plurality of messages.

10. The method of claim 9 further comprising in the proxy service, and in response to the web service in the client application returning to the proxy service after not having missed any of the plurality of web services requests while temporarily unavailable to the proxy service, instructing the client application through the web service to refrain from querying the online service.

11. The method of claim 10 wherein instructing the client application to query the online service with respect to at least the one of the plurality of web services requests comprises communicating a request path associated with the online service with which the client application queries the online service with respect to at least the missed message.

12. The method of claim 10 wherein instructing the client application to query the online service with respect to at least the one of the plurality of web services requests comprises communicating a flag set to indicate whether or not to query the online service with respect to at least the missed message.

13. The method of claim 9 wherein the client application comprises the web service and a plurality of components and wherein the online service comprises a plurality of sub-services corresponding to the plurality of components.

14. The method of claim 13 wherein attempting to communicate the plurality of messages to the client application comprises attempting to communicate each of the plurality of messages to a different one of the plurality of components.

15. The method of claim 14 wherein the plurality of sub-services comprises a voice calling service and an instant messaging service, and wherein the plurality of components comprises a voice calling component and an instant messaging component.

16. The method of claim 9 further comprising, in the proxy service, monitoring for when the web service in the client application transitions from being temporarily unavailable to fully unavailable and, in response to the web service returning to the proxy service after having been fully unavailable, instructing the client application through the web service to query the online service regardless of whether or not the any of the plurality of messages were missed while the web service was unavailable.

17. An apparatus comprising:
one or more non-transitory computer readable storage media;
a processing system operatively coupled with the one or more computer readable storage media; and
program instructions stored on the one or more computer readable storage media for facilitating web services interaction between a client application and an online service, wherein the client application provides a server-side of the web services to the online service, and wherein the program instructions comprise:

a web service running in the client application that, when executed by the processing system, directs the processing system to at least:
   expose a plurality of components in the client application to a plurality of sub-services in the online service through a proxy service for a server-side of the web services;
   in response to activity information received from the proxy service upon the web service reconnecting to the proxy service after being temporarily disconnected, prompt each component of the plurality of components to poll a corresponding service of the plurality of sub-services if the activity information indicates that web services activity was missed for the component while the web service was temporarily disconnected; and the plurality of components, wherein each of the plurality of components, when executed by the processing system, directs the processing system to initiate polling of a corresponding one of the plurality of sub-services for at least a portion of the web services activity that was missed while the web service was temporarily disconnected.

18. The apparatus of claim 17 wherein the web service further directs the processing system to, in response to the activity information received from the proxy service upon the web service reconnecting to the proxy service after being temporarily disconnected, prompt each component of the plurality of components to refrain from polling the corresponding service of the plurality of sub-services if the activity information indicates that no web services activity was missed for the component while the web service was temporarily disconnected.

19. The apparatus of claim 18 wherein the web service further directs the processing system to, in response to reconnecting to the proxy service after being fully disconnected, prompt the plurality of components to poll the plurality of sub-services for any web services activity.

20. The apparatus of claim 19 wherein the plurality of components comprises a voice calling component, an instant messaging component, and a voice mail component.

* * * * *